US010257653B2

(12) United States Patent
Fan et al.

(10) Patent No.: US 10,257,653 B2
(45) Date of Patent: Apr. 9, 2019

(54) LOCATION-BASED MOBILE DEVICE CONTROL

(71) Applicant: International Business Machines Corporation, Armonk, NY (US)

(72) Inventors: Si B. Fan, Beijing (CN); Yu Gu, Cedar Park, TX (US); Su Liu, Austin, TX (US); Cheng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/607,172

(22) Filed: May 26, 2017

(65) Prior Publication Data

US 2018/0343544 A1 Nov. 29, 2018

(51) Int. Cl.
| | |
|---|---|
| H04W 4/02 | (2018.01) |
| A63H 30/04 | (2006.01) |
| A63F 9/24 | (2006.01) |
| G06K 7/10 | (2006.01) |
| G01S 5/08 | (2006.01) |

(52) U.S. Cl.
CPC ............ *H04W 4/025* (2013.01); *A63H 30/04* (2013.01); *A63F 2009/2489* (2013.01); *G01S 5/08* (2013.01); *G06K 7/10237* (2013.01); *G06K 7/10356* (2013.01); *H04Q 2209/47* (2013.01)

(58) Field of Classification Search
CPC ... H04W 4/025; A63H 30/04; H04Q 2209/47; G01S 5/08; G06K 7/10356; G06K 7/10237; A63F 2009/2489
See application file for complete search history.

(56) References Cited

U.S. PATENT DOCUMENTS

| | | | |
|---|---|---|---|
| 5,442,805 A | 8/1995 | Sagers et al. | |
| 6,011,973 A * | 1/2000 | Valentine | ............. H04W 48/04 342/357.59 |

(Continued)

FOREIGN PATENT DOCUMENTS

IN     2991/CHE/2011     6/2013

OTHER PUBLICATIONS

Jose Pagliery, "How the NSA can 'turn on' your phone remotley", http://money.cnn.com/2014/06/06/technology/security/nsa-turn-on0phone/index.html Jun. 6, 2014, 3 pages.

(Continued)

*Primary Examiner* — Brian E Miller
(74) *Attorney, Agent, or Firm* — Kunzler, PC

(57) ABSTRACT

A system is disclosed. The system includes a first radio frequency identifier (RFID) component, a second RFID component, a location estimator, and a controller. The first RFID component is associated with a mobile device. The second RFID component communicates with the first RFID component. The location estimator is in communication with at least one of the first RFID component and the second RFID component. The location estimator determines a location of the mobile device by analyzing a response time of a communication between the first RFID component and the second RFID component to estimate a distance between the first RFID component and the second RFID component. The controller is in communication with the mobile device to execute an operation on the mobile device in response to a determination that the location of the mobile device corresponds to a trigger location.

20 Claims, 5 Drawing Sheets

(56) References Cited

U.S. PATENT DOCUMENTS

| | | | |
|---|---|---|---|
| 6,184,651 B1 | 2/2001 | Fernandez et al. | |
| 6,961,561 B2* | 11/2005 | Himmel | H04M 1/7253 455/419 |
| 7,295,925 B2 | 11/2007 | Breed et al. | |
| 7,426,197 B2* | 9/2008 | Schotten | G01S 1/68 340/539.1 |
| 7,864,072 B2 | 1/2011 | Basson et al. | |
| 8,000,692 B2* | 8/2011 | Abel | H04L 63/104 455/412.1 |
| 9,066,199 B2* | 6/2015 | Forstall | H04W 4/02 |
| 9,088,665 B2* | 7/2015 | Boyer | H04M 1/72566 |
| 9,265,450 B1* | 2/2016 | Giobbi | G06K 19/0718 |
| 9,398,141 B2* | 7/2016 | Naftolin | G06F 9/448 |
| 9,462,114 B2 | 10/2016 | Naftolin | |
| 9,479,631 B2* | 10/2016 | Kennedy | H04M 1/7253 |
| 9,483,937 B2 | 11/2016 | Todasco | |
| 9,973,619 B2* | 5/2018 | Almurayh | H04M 1/72572 |
| 2006/0063563 A1* | 3/2006 | Kaufman | H04M 1/663 455/556.2 |
| 2006/0114104 A1* | 6/2006 | Scaramozzino | G01S 5/02 340/10.2 |
| 2010/0102991 A1 | 4/2010 | Hernandez Gonzalez et al. | |
| 2011/0195701 A1* | 8/2011 | Cook | G01S 5/0018 455/422.1 |
| 2011/0254664 A1* | 10/2011 | Sadr | H04Q 9/00 340/10.1 |
| 2013/0012270 A1* | 1/2013 | Naftolin | G06F 9/448 455/566 |
| 2013/0207803 A1 | 8/2013 | Charych | |
| 2013/0232332 A1* | 9/2013 | Naftolin | G06F 9/448 713/100 |
| 2014/0148190 A1* | 5/2014 | Lancaster | H04W 4/025 455/454 |
| 2014/0285317 A1 | 9/2014 | Shimizu et al. | |
| 2015/0048789 A1 | 2/2015 | Kim et al. | |
| 2015/0084791 A1 | 3/2015 | Jang | |
| 2016/0140840 A1 | 5/2016 | Duncan et al. | |
| 2016/0189227 A1 | 6/2016 | Gandhi et al. | |
| 2017/0018176 A1 | 1/2017 | Chang | |
| 2017/0134564 A1* | 5/2017 | Almurayh | H04M 1/72572 |
| 2017/0265039 A1* | 9/2017 | Bruck | H04W 4/02 |

OTHER PUBLICATIONS

Sarah Griffiths, "The end of phones ruining your trip to the cinema? Microsoft patent reveals mode that automatically mutes and dims a device", Daily Mail Online, Jan. 19, 2015, 3 pages.

Pelin Angin et al., "A Mobile-Cloud Collaborative Traffic Lights Detector for Blind Navigation", https://www.cs.purdue.edu/homes/bb/cs590/handouts/Pelin., May 23-26, 2010, 5 pages.

Mobile Phone Restrictions Fact Sheet, FMCSA United States Department of Transportation, https://www.fmcsa.dot.gov/driver-safety/distracted-driving/mobile-phone-restrictions-fact-sheet., Known about as early as Feb. 21, 2017, 2 pages.

Scooter Willis et al., "RFID Information Grid and Wearable Computing Solution to the Problem of Wayfinding for the Blind User in a Campus Environment", https://www.cs.umd.edu/class/fall2006/cmsc828s/PAPERS.dir/willis-RFID-ISWC, Apr. 2011, 8 pages.

A. Ruhanen et al., Sensor-enabled RFID tag handbook, Bridge, Jan. 2008, 27 pages.

Zhao et al., "A battery-free RFID-based Indoor Acoustic Localization Platform" 2013 IEEE International Conference on RFID, (2013), 8 pages.

Shu et al "TOC: Localizing Wireless Rechargeable Sensors with Time of Charge" 2014 Proceedings IEEE Infocom, (2014), 9 pages.

* cited by examiner

LOCATION-BASED MOBILE DEVICE CONTROL

FIELD

The subject matter disclosed herein relates to control of a mobile device and more particularly relates to mobile device control based on location.

BACKGROUND

Personal electronic devices are becoming more common in society. Many personal devices offer a wide range of features and capabilities which provide unbounded functionality and constant access to information and entertainment. In some instances, these features and capabilities can be supplemented, modified, and adjusted to fit a particular use or to provide a particular functionality. This wide range of customizable features and capabilities can prove useful and distracting in a wide variety of circumstances and locations.

BRIEF SUMMARY

A system is disclosed. The system includes a first radio frequency identifier (RFID) component, a second RFID component, a location estimator, and a controller. The first RFID component is associated with a mobile device. The second RFID component communicates with the first RFID component. The location estimator is in communication with at least one of the first RFID component and the second RFID component. The location estimator determines a location of the mobile device by analyzing a response time of a communication between the first RFID component and the second RFID component to estimate a distance between the first RFID component and the second RFID component. The controller is in communication with the mobile device to execute an operation on the mobile device in response to a determination that the location of the mobile device corresponds to a trigger location.

A method is also disclosed. The method includes monitoring a communication between a first radio frequency identifier (RFID) component and a second RFID component. The first RFID component is associated with a mobile device. The method also includes determining a response time of the communication between the first RFID component and the second RFID component. The method also includes determining a location of the first RFID component associated with the mobile device based on the response time of the communication between the first RFID component and the second RFID component. The method also includes executing an operation on the mobile device in response to a determination that the location of the mobile device corresponds to a trigger location.

A computer program product which includes a computer readable storage medium having program instructions embodied therewith. The program instructions readable/executable by a processor to cause the processor to receive communication data for communication between a first radio frequency identifier (RFID) component and a second RFID component and between the first RFID component and a third RFID component. The first RFID component associated with a mobile device. The program instructions readable/executable by the processor are further to cause the processor to determine response times of the communications between the first RFID component and the second RFID component and between the first RFID component and the third RFID component based on the communication data. The program instructions readable/executable by the processor are further to cause the processor to determine a location of the first RFID component associate with the mobile device based on the response time and known locations of the second RFID component and the third RFID component. The program instructions readable/executable by the processor are further to cause the processor to execute an operation affecting the mobile device in response to a determination that the mobile device corresponds to a trigger location.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
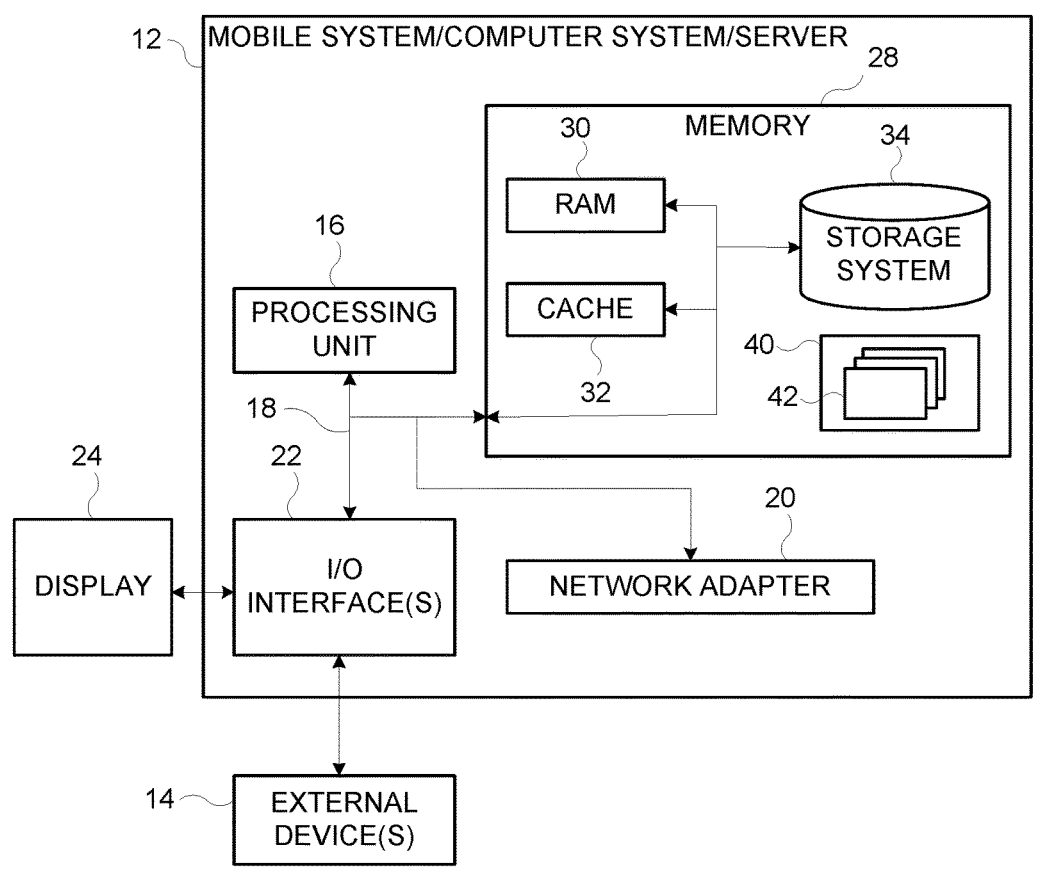
FIG. 1 is a schematic diagram illustrating one embodiment of a computer system which is applicable to implement the embodiments of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server, and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product. Alternatively, the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product, in one embodiment, may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally, the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions which identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server, and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely, parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

The computer program product, in one embodiment, may be deployed, accessed, and executed using a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the computer program product (i.e. the software resides elsewhere) wherein the lifetime of the VPN is limited to a given period of time or a given number of deployments based on an amount paid.

The computer program product may be deployed, accessed, and executed through either a remote-access or a site-to-site VPN. When using the remote-access VPNs the computer program product is deployed, accessed, and executed via the secure, encrypted connections between a company's private network and remote users through a third-party service provider. The enterprise service provider (ESP) sets up a network access server (NAS) and provides the remote users with desktop client software for their computers. The telecommuters can then dial a toll-free number or attach directly via a cable or DSL modem to reach the NAS and use their VPN client software to access the corporate network and to access, download and execute the computer program product.

When using the site-to-site VPN, the computer program product is deployed, accessed, and executed through the use of dedicated equipment and large-scale encryption that are used to connect a company's multiple fixed sites over a public network such as the Internet.

The computer program product is transported over the VPN via tunneling which is the process of placing an entire packet within another packet and sending it over a network. The protocol of the outer packet is understood by the network and both points, called tunnel interfaces, where the packet enters and exits the network.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

FIG. 1 shows an exemplary mobile system/computer system/server 12 (hereinafter system 12) which is applicable to implement the embodiments of the present disclosure. System 12 is only illustrative and is not intended to suggest any limitation as to the scope of use or functionality of embodiments of the disclosure described herein.

As shown in FIG. 1, system 12 is shown in the form of a general-purpose computing device. The components of system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

System 12 typically includes a variety of computer system readable media. Such media may be any available media that is accessible by system 12, and it includes both volatile and non-volatile media, removable and non-removable media.

System memory 28 can include computer system readable media in the form of volatile memory, such as random access memory (RAM) 30 and/or cache memory 32. System 12 may further include other removable/non-removable, volatile/non-volatile computer system storage media. By way of example only, storage system 34 can be provided for reading from and writing to a storage media (not shown and typically called a "drive"). Although not shown, a magnetic disk drive for reading from and writing to a removable, non-volatile solid state drive, magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data, or some combination thereof, may include an implementation of a networking environment. Program modules 42 generally carry out the functions and/or methodologies of embodiments of the disclosure as described herein.

System 12 may also communicate with one or more external devices 14 such as a keyboard, a pointing device, a display 24, etc.; one or more devices that enable a user to interact with system 12; and/or any devices (e.g., network card, modem, etc.) that enable system 12 to communicate with one or more other computing devices. Such communication can occur via input/output (I/O) interfaces 22. Still yet, system 12 can communicate with one or more networks such as a local area network (LAN), a general wide area network (WAN), and/or a public network (e.g., the Internet) via network adapter 20. As depicted, network adapter 20 communicates with the other components of system 12 via bus 18. While not shown, other hardware and/or software components could be used in conjunction with system 12. Examples, include, but are not limited to: microcode, device drivers, redundant processing units, external disk drive arrays, RAID systems, tape drives, and data archival storage systems, etc.

In one embodiment, the system 12 is a server for managing a mobile device dependent on the location of the mobile device relative to a trigger location such as a crosswalk, roadway, intersection, building, classroom, conference room, terminal, checkpoint, or other location. In another embodiment, the system 12 is a mobile system that receives a signal to execute an operation on the mobile system 12 in response to a determination that the mobile system 12 has entered a trigger location. For example, the operation may include disabling the display 24, disabling a ringtone or alert tone, disabling a notification, displaying a disable notification indicating a disabled state of the mobile device, reducing a function of the processing unit 16 or other component of the system 12. In another embodiment, the system 12 executes a permission operation which makes available an otherwise unavailable function on the system 12 in response to a determination that the system 12 is in a trigger location. For example, the system 12 may be able to access a document stored on the storage system 34 in response to the operation. In another example, the system 12 is allowed access to a network on the external device 14 or via the network adapter 20. Other examples are described below.

Figure 2:
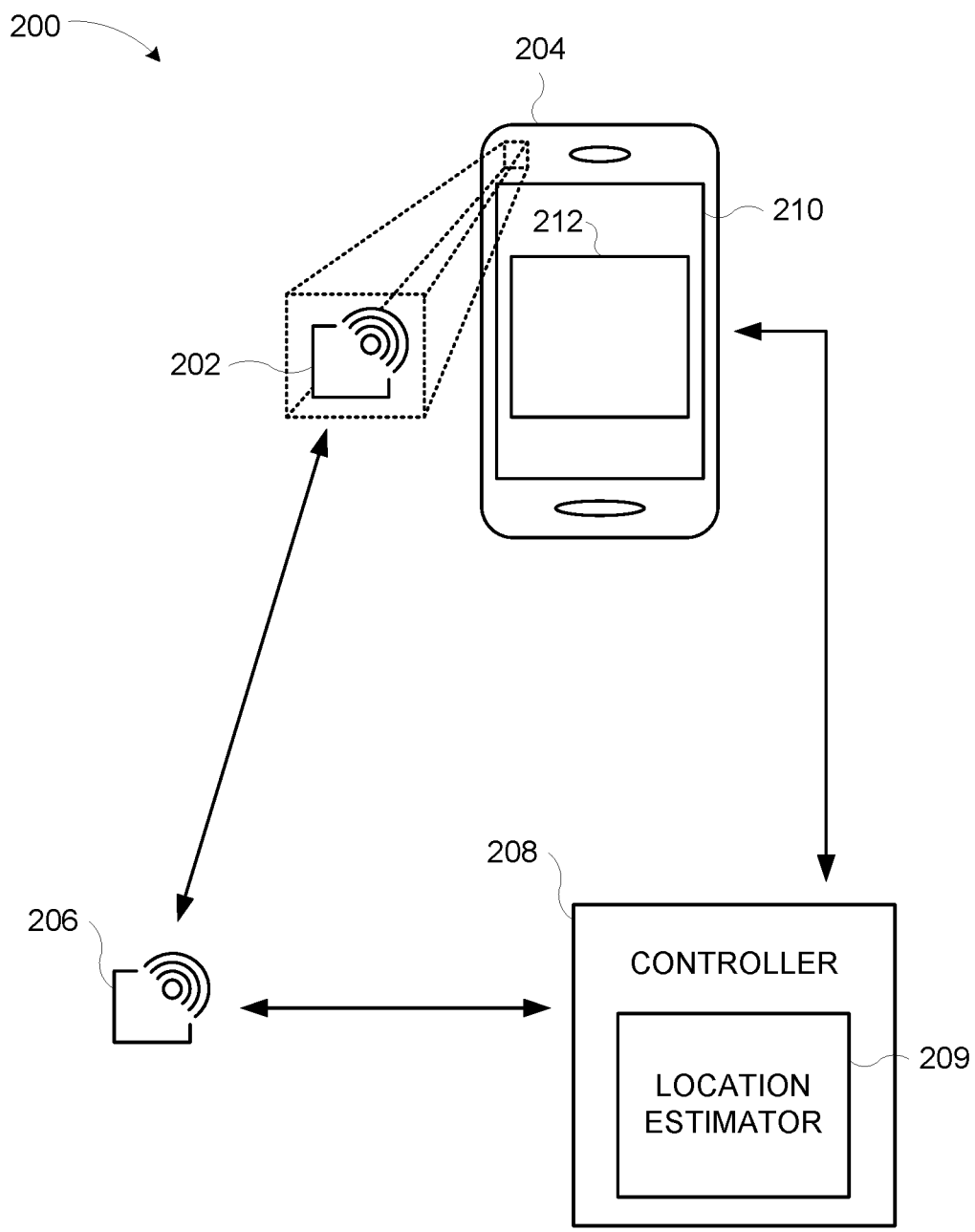
FIG. 2 is a schematic diagram illustrating one embodiment of a location-based mobile device control system in accordance with the present invention.

FIG. 2 is a schematic diagram illustrating one embodiment of a location-based mobile device control system 200 in accordance with the present invention. The illustrated embodiment includes a first radio frequency identifier (RFID) component 202. The first RFID component 202 is associated with a mobile device 204. In the illustrated embodiment, the first RFID component 202 is a component of the mobile device 204. In some embodiments, the first RFID component 202 is separate from the mobile device 204.

In some embodiments, the first RFID component 202 is an RFID reader. In other embodiments, the first RFID component 202 is an RFID tag. For example, the RFID component 202 may be an active tag, a semi-active tag, a passive tag, an inductive tag, or a capacitive tag. In some embodiments, the first RFID component 202 is a dedicated location detection component. In other embodiments, the first RFID component 202 is a component with other functionality such as a component for identification or other function within the mobile device 204 or as a separate component. For example, the first RFID component 202 may be a key, a key fob, a pass card, or other RFID component.

In the illustrated embodiment, the first RFID component 202 communicates with a second RFID component 206. In some embodiments, the second RFID component 206 is an RFID reader. In other embodiments, the second RFID component 206 is an RFID tag. While the components 202 and 206 are described herein as RFID components, it is to be understood that other non-RFID components may be used to communicate within the system 200.

In some embodiments, the first RFID component is an RFID reader and the second RFID component 206 is an RFID tag. In other embodiments, the second RFID component 206 is an RFID reader and the first RFID component 202 is an RFID tag. In this embodiment, the second RFID component 206 provides an interrogation signal to the first RFID component 202. In the embodiment in which the first RFID component 202 comprises a passive tag, the interrogation signal provides sufficient power to the first RFID component 202 to generate and send a response signal back to the second RFID component 206.

In other embodiments, the interrogation signal does not provide the power to the first RFID component 202 needed to generate and send the response signal but does prompt a response signal from the first RFID component 202. In some embodiments, the interrogation signal from the second RFID component 206 provides charge to a battery or other power storage device on the first RFID component 202 over a transmission time of the interrogation signal. In some embodiments, the charge provided by the interrogation signal provides the power to generate a response signal. In other embodiments, the charge is stored to the power storage device and is not needed for generation of the power signal.

In some embodiments, the response signal provided by the first RFID component 202 to the second RFID component 206 comprises data stored on the first RFID component 202 for generating the response signal. The data may include identifier information to identify the first RFID component 202, the mobile device 204, an associated user, a client used by the mobile device 204, or another aspect or quality of an element of the system 200. In some embodiments, the interrogation signal from the second RFID component 206 is transmitting at an interrogation frequency and the response signal from the first RFID component 202 is transmitted at a response frequency different from the interrogation frequency. In other embodiments, the interrogation frequency and the response frequency are the same frequency.

In some embodiments, the first RFID component 202 receives the signal for a certain amount of time in order to generate enough power to transmit the response signal or receive a charge amount in a power storage device. In some embodiments, the first RFID component 202 sends a response signal in response to the charge level of the first RFID component 202 reaching a certain level. The delay in reaching the charge level results in a delay between the transmission of the interrogation signal by the second RFID component and the sending of the response signal from the first RFID component 202 to the second RFID component 206.

In some embodiments, the second RFID component 206 records the time at which the interrogation signal is sent to the first RFID component 202 and records the time at which the response signal is received from the first RFID component 202. In some embodiments, the recorded times are sent to a controller 208. In some embodiments, the second RFID component 206 provides identifying information related to the second RFID component 206 and the first RFID component 202. Other information, such as the location of the second RFID component may also be sent to the controller 208.

In the illustrated embodiment, the controller 208 is shown as an element separate from the second RFID component 206 and separate from the mobile device 204. In some embodiments, the controller 208 is a server or other computing system (i.e. system 12 of FIG. 1) located remote from the RFID components 202 and 206 and the mobile device 204. In some embodiments, the controller 208 is located at a centralized facility. In another embodiment, the controller 208 is located geographically near the second RFID component 206. In further embodiments, the controller 208 includes the second RFID component 206. In some embodiments, the controller 208 is included in the mobile device 204 or the first RFID component 202.

In some embodiments, the second RFID component 206 is installed in a location that allows for communication with the first RFID component 202. For example, the second RFID component 206 may be installed or incorporated into a building, traffic light, street lamp, road sign or sign post, bridge, wall or fence, or other structure. In another example, the second RFID component 206 may be a stand-alone device having an independent structure.

In the illustrated embodiment, the controller 208 includes a location estimator 209. In some embodiments, the controller 208 receives the data from the second RFID component 206 and calculates a response time for the first RFID component 202. In some embodiments, the response time is compared, by the location estimator 209, to known charge rates for the first RFID component 202 to calculate a distance between the first RFID component 202 and the second RFID component 206. In some embodiments, the calculated distance is applied, by the location estimator 209, to data detailing the location of the second RFID component 206 to estimate a location of the first RFID component 202 and the associated mobile device 204. In some embodiments, the accuracy of the location estimation is within thirty centimeters.

In some embodiments, the controller 208 requests that additional data points be obtained by the second RFID component 206. The second RFID component 206 transmits a second interrogation signal to the first RFID component 202, receives a response with a corresponding time delay, and sends data corresponding to this requested communication to the controller 208 for analysis.

In some embodiments, the location estimation corresponding to the first RFID component 202 is compared to a previous record for the first RFID component 202 to determine a travel vector of the first RFID component 202. For example, the travel vector may be calculated using a previous location estimation having a previous time record in view of the current location estimation based on the current time record. This information may be used to determine a direction and speed of travel of the first RFID component 202 relative to the second RFID component 206. In some embodiments, the location of the second RFID component 206 is known and the total direction and speed of travel of the first RFID component 202 can be determined by the location estimator 209.

In some embodiments, the controller 208 returns data to the second RFID component 206. In some embodiments, the data returned to the second RFID component 206 causes the second RFID component 206 to modify a parameter of the function of the second RFID component 206. For example, the controller 208 may instruct the second RFID component 206 to dynamically adjust the power level of the interrogation signal provided by the second RFID component 206. In another example, the instructions from the controller 208 may adjust a frequency at which the interrogation signal is communicated or the number of interrogation signals generated by the second RFID component 206. In further embodiments, the instructions from the controller 208 may adjust a timing of the interrogation signal or other trigger for transmitting the interrogation signal from the second RFID component 206. Other parameters may also be modified on a regular or irregular schedule or in response to other variables.

In some embodiments, a determination of the location and vector of travel of the first RFID component 202, by the location estimator 209, is used to determine, by the controller 208, the operation to execute on the mobile device 204. For example, if a trigger location is established on a crosswalk, the controller 208 may distinguish between a passenger in a vehicle crossing over the crosswalk and a pedestrian crossing the crosswalk based on the vector of travel of each corresponding RFID component. In this example, both speed and direction can be used to determine whether to execute an operation and what operation, if any, to execute.

In some embodiments, the controller 208 determines whether to execute an operation by comparing the estimated location to one or more trigger locations. The trigger locations may be stored in the controller 208 or remote to the controller 208. In some embodiments, the trigger location is a geographic point and a threshold around the point. For example, the trigger location may be a GPS location with a threshold of a certain distance (i.e. within X meters from GPS location Y). In other embodiments, the trigger location is a region with defined edge boundaries. The trigger location may take other forms such as buildings, properties, etc. and may change based on time of day, month, year, events, etc.

In response to a determination that the location of the first RFID component 202 corresponds with a trigger location, the controller 208 sends a command to execute an operation on the mobile device. In some embodiments, the command is sent to a client installed on the device or to a network apparatus supplying data to the device. In some embodiments, the operation executed on the mobile device is time based. For example, the operation may remain in effect for a certain duration. In another example, the operation remains in effect for a certain duration after the first RFID component 202 has left the trigger location. In other embodiments, the operation is executed on the mobile device until it is determined that the first RFID component 202 no longer corresponds to the trigger location. In other embodiments, the operation is permanently executed in response to a determination that the location of the first RFID component 202 corresponds with the trigger location. For example, once the first RFID component has been determined to be at a certain trigger location, access to a database is disabled or once a checkpoint has been crossed, certain functionality is unlocked. Other similar examples are also contemplated.

In some embodiments, the operation is a restriction operation. The restriction operation may include a command to restrict features or functionality of the mobile device 204 in response to a determination that the first RFID component 202 associated with the mobile device 204 corresponds with a location associated with the trigger location. For example, the restriction operation may include disabling the mobile device 204, disabling a display of the mobile device 204, restricting voice calls, text messaging, email, video chat, or other communication features of the mobile device 204, restricting access to a network or source of data such as a document or server by the mobile device 204, etc.

In other embodiments, the operation is a permission operation. The permission operation may include a command to allow features or functionality of the mobile device 204 while the first RFID component 202 associated with the mobile device 202 is determined to be at a location corresponding to the trigger location. For example, the permission operation may include permission to access a system, apparatus, network, document, or other data source. In a further example, the permission operation may provide access to functionality in software such as an application or program on the mobile device or hardware such as a port, network interface, server, camera, microphone, communications array, or other hardware of the mobile device 204 or accessible to the mobile device 204.

In some embodiments, the operation or permission is time-sensitive. In other words, in some embodiments, the operation is executed in response to a determination that the location of the first RFID component 202 corresponds to a trigger location and the operation is valid or provides or restricts the corresponding functionality on the mobile device 204 for a period of time. The period of time may be set automatically, may correspond to the nature of the operation, may correspond to access privileges of the device or user, or may be determined by some other criteria or combination of criteria.

In other embodiments, the operation remains in effect until it is determined that the location of the first RFID component 202 no longer corresponds to the trigger location. In further embodiments, the operation remains in effect until the location of the first RFID component 202 is determined to correspond to another trigger location which executes a subsequent operation affecting the previous operation. Other criteria for persistence or expiration of the operation are contemplated.

In some embodiments, the mobile device 204 includes a display 210 to display a user interface 212. In some embodiments, the user interface 212 displays an alert corresponding to the operation executed in response to a determination that the first RFID component 202 has entered a trigger location. In some embodiments, the user interface 212 provides interface elements to facilitate acceptance or rejection of the operation. In other embodiments, the user interface 212 provides notification without the ability to allow or reject the operation.

In some embodiments, the user interface 212 is provided on the display 210 of the mobile device 204. In other embodiments, the user interface 212 is provided on a device separate from the mobile device 204. For example, the user interface 212 may be provided on the device of an administrator, parent, employer, supervisor, or other device having charge over the mobile device 204.

In some embodiments, the user interface 212 provides functionality to change a setting or preference corresponding to the operation, location detection, permissions, restrictions, identification, or other information or functionality relating to the mobile device 204, the first RFID component 202, communications between elements in the system 200, location information, etc. In other embodiments, the user interface.

In some embodiments, the settings on the user interface 212 are adjustable from the device of an administrator. In other embodiments, the settings on the user interface 212 require authentication of a user prior to granting access to the settings or applying a change to the settings. Other manners of managing the settings or operations of the system 200 are contemplated.

In the embodiments described above, the controller 208 is described as receiving information from the second RFID component 206. In other embodiments, the controller 208 is associated, and communicates, with a plurality of RFID components. In some embodiments, the controller 208 is associated with RFID components based on geographic location. In other embodiments, the controller 208 is associated with RFID components based on a type of trigger location monitored by the RFID components. In further embodiments, the controller 208 is associated with RFID components based on the operations executed by the controller 208. Other arrangements of the controller 208 in association with one or more RFID components are contemplated.

Similarly, the second RFID component 206 is capable of communicating with a plurality of first RFID components 202. In some embodiments, the second RFID component 206 is located in a public place and communicates with a plurality of first RFID components 202 to determine a location for each of the plurality of first RFID components 202. For example, a single second RFID component 206 may communicate with multiple separate first RFID components 202 at an intersection, in or near a building, or other location.

Figure 3:
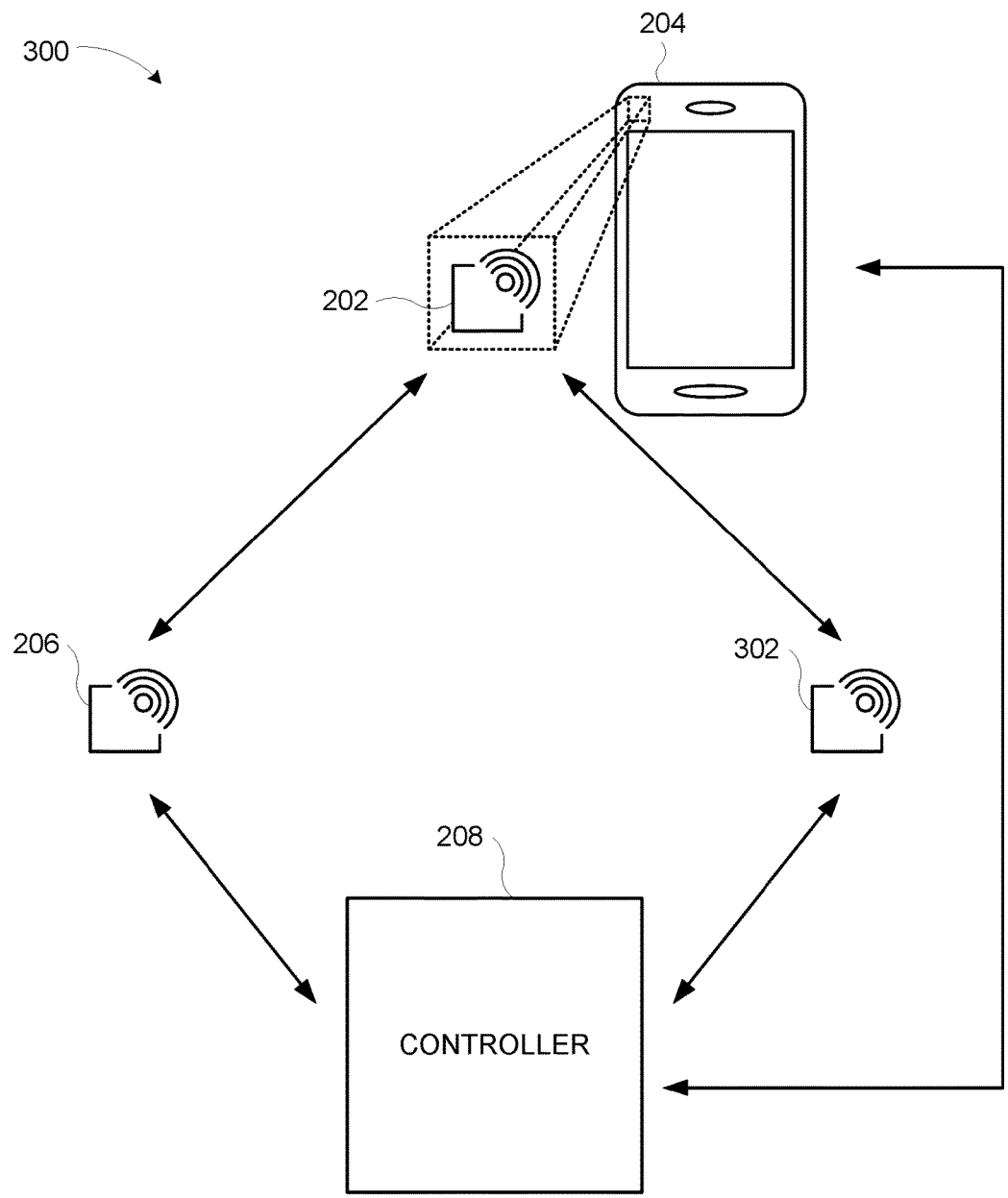
FIG. 3 is a schematic diagram illustrating another embodiment of a location-based mobile device control system in accordance with the present invention.

FIG. 3 is a schematic diagram illustrating another embodiment of a location-based mobile device control system 300 in accordance with the present invention. Similar to the embodiments described above, the illustrated embodiment of the system 300 shown in FIG. 3 includes the first RFID component 202, the mobile device 204 associated with the first RFID component 202, the second RFID component 206 to communicate with the first RFID component 202, and the controller 208.

In this illustrated embodiment, the system 300 further includes a third RFID component 302. In some embodiments, the third RFID component 302 comprises a RFID reader or tag capable of communicating with the first RFID component 202. In some embodiments, the third RFID component 302 communicates with the first RFID component 202 in a similar manner to the communication that occurs between the first RFID component 202 and the second RFID component 206.

In some embodiments, the third RFID component 302 sends an interrogation signal to the first RFID component 202 and receives a response signal from the first RFID component 202. The response signal from the first RFID component 202 is received a certain time after supplying the interrogation signal. Information describing the time between supplying the interrogation signal by the third RFID component 302 and receiving the response signal from the first RFID component 202 is sent to the controller 208.

In some embodiments, the information received by the controller 208 from the second RFID component 206 and the third RFID component 302 allows the controller 208 to determine a location of the first RFID component 202 and the associated mobile device 204. In some embodiments, the addition of the information from the third RFID component 302 and location of the third RFID component 302 analyzed in conjunction with the information from the second RFID component 206 and location of the second RFID component 206 improves the accuracy of the determination of the location of the first RFID component 202. In further embodiments, additional RFID components can be added to further improve accuracy of the calculation of the location of the first RFID component 202 and movement of the first RFID component 202.

In some embodiments, information sent to the controller 208 from both the second RFID component 206 and the third RFID component 302 includes data identifying the first RFID component 202 to facilitate combining information from the second and third RFID components 206 and 302 to determine a location of the first RFID component 202. In some embodiments, the controller 208 handles data for determining the location of more than one RFID component and corresponding mobile devices. In these embodiments, the controller 208 processes the incoming information based on the identifiers of the RFID component to be located. Other manners of separating incoming data may be employed.

Figure 4:
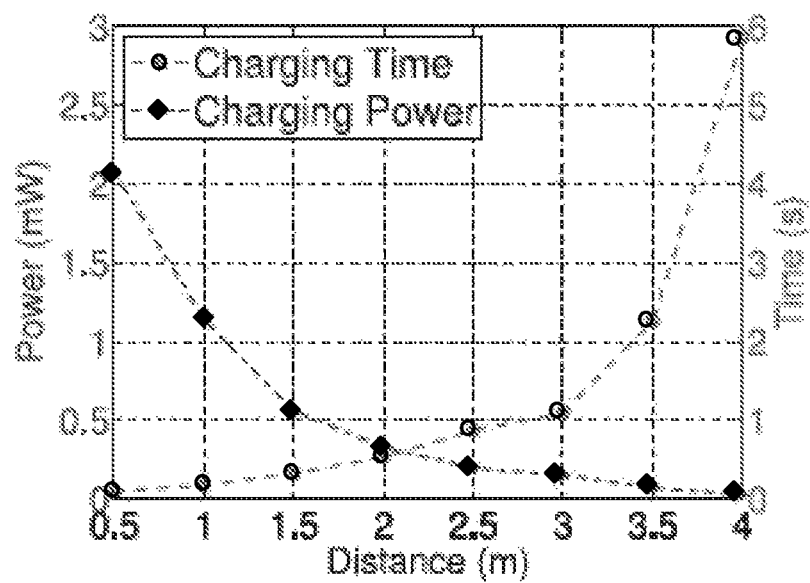
FIG. 4 is a graph illustrating one embodiment a relationship between power level and charge time based on distance in accordance with the present invention.

FIG. 4 is a graph 400 illustrating one embodiment a relationship between power level and charge time based on distance in accordance with the present invention. In the illustrated graph 400, as distance increases along the bottom of the graph 400, the amount of charging power delivered to an RFID tag decreases given a constant power output. In the illustrated graph 400, as distance between an RFID reader and an RFID tag increases, the time to charge the RFID tag also increases.

In some embodiments, once the effect of distance on the charging power and on the time to charge a given RFID tag is known, a response time of the RFID tag can be used to determine a distance of the RFID tag from a first RFID reader. Using a second RFID reader at a separate location from the first RFID reader can facilitate calculation of the location of the RFID tag. In some embodiments, additional RFID readers at other locations can further improve the accuracy of the location determination. In some embodiments, data from the RFID components is combined with global positioning system (GPS) data and/or network triangulation data to check and further accurize the location calculated by the controller 208.

Figure 5:
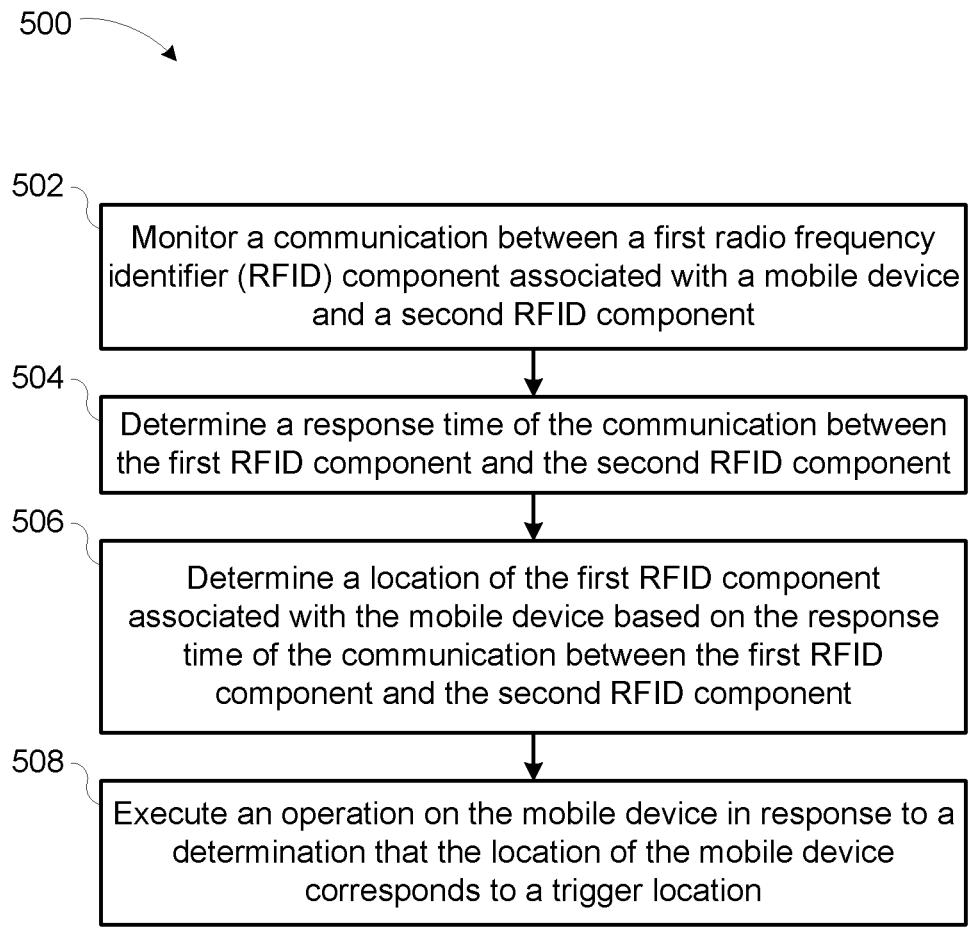
FIG. 5 is a schematic flow chart diagram illustrating one embodiment of a method in accordance with the present invention.

FIG. 5 is a schematic flow chart diagram illustrating one embodiment of a method 500 in accordance with the present invention. In the illustrated embodiment, the method 500 includes monitoring, at block 502 a communication between a first radio frequency identifier (RFID) component associated with a mobile device and a second RFID component. In some embodiments, monitoring the communication includes analyzing the communication in response to receipt of data corresponding to the communication.

In other embodiments, monitoring the communication includes actively monitoring the communication in real-time. In some embodiments, monitoring the communication is executed on the mobile device. In other embodiments, monitoring the communication is executed on a server or other system external to the mobile device.

The method 500 also includes, at block 504, determining a response time of the communication between the first RFID component and the second RFID component. In some embodiments, the response time is a result of one of the first and second RFID components charging prior to sending a portion of the communication.

The method 500 also includes, at block 506, determining a location of the first RFID component associated with the mobile device based on the response time of the communication between the first RFID component and the second RFID component. In some embodiments, the response time is used to calculate the location of the first RFID component based on a known decrease in a power signal over distance. In some embodiments, a certain type of RFID component charges at a rate that is dependent on the distance between the RFID tag and the RFID reader.

In some embodiments, the location of the first RFID component is determined by a controller. The controller may be located on the mobile device, at a central location, at or geographically near the second RFID component, or at another location or with another device.

In some embodiments, the determination of the location of the first RFID component is determined by a machine learning algorithm. In some embodiments, the machine learning algorithm determines the location of the first RFID component by constructing and updating a model for location determination specific to one or more RFID components or generic to location of RFID components. In some embodiments, the machine learning algorithm constructs the model based on historical RFID component location data and updates the model in response to additional data being received.

The method 500 also includes, at block 508, executing an operation on the mobile device in response to a determination that the location of the mobile device corresponds to a trigger location. In some embodiments, executing the operation on the mobile device includes sending a command to the mobile device to execute the operation. In other embodiments, executing the operation includes generating and executing the operation locally on the mobile device.

In some embodiments, executing the operation includes performing the operation at a network or system asset to affect the mobile device. For example, the operation may include restricting access to a communication network or a portion of the communication network such as text messaging, video communication, voice communication, data services, etc. In another example, the operation includes providing permission or access to the mobile device such as network permissions, file access, document permissions, supplying data, etc.

In some embodiments, the trigger location is a geographic location. In some embodiments, the trigger location is time dependent. For example, the trigger location may become active in response to an event or during a specified timeframe such as rush hour, activation of a crosswalk crossing signal or traffic signal, a concert, sale, road closure, etc. Other variable may be used to establish and manage a trigger location.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
    a first radio frequency identifier (RFID) component associated with a mobile device;
    a second RFID component that communicates with the first RFID component;
    a location estimator in communication with at least one of the first RFID component and the second RFID component, the location estimator to determine a location of the mobile device by analyzing a response time of a communication between the first RFID component and the second RFID component to estimate a distance between the first RFID component and the second RFID component, wherein the response time of the communication between the first RFID and the second RFID is associated with a charge time of one of the first RFID component and the second RFID component; and
    a controller in communication with the mobile device to execute an operation on the mobile device in response to a determination that the location of the mobile device corresponds to a trigger location.

2. The system of claim 1, wherein the first RFID component comprises one of a RFID tag and a RFID reader and the second RFID component comprises the other of the RFID tag and the RFID reader.

3. The system of claim 2, wherein the RFID tag comprises one of an inductive RFID tag, a capacitive RFID tag, a passive RFID tag, a semi-passive RFID tag, and an active RFID tag.

4. The system of claim 1, wherein analyzing the response time of the communication between first RFID component and the second RFID component comprises applying a machine learning algorithm to the response time of the communication.

5. The system of claim 4, wherein the machine learning algorithm correlates the response time of the communication with a location of the second RFID component to determine the location of the mobile device based on a charge time of one of the first RFID component and the second RFID component.

6. The system of claim 1, further comprising a third RFID component located remote to the second RFID component and in communication with the first RFID component to provide a response time associated with the communication between the first RFID component and the third RFID component to further determine the location of the mobile device.

7. The system of claim 1, wherein the controller is in communication with one of the first RFID component and the second RFID component to dynamically control a power signal in the communication between the first RFID component and the second RFID component.

8. A method comprising:
monitoring a communication between a first radio frequency identifier (RFID) component and a second RFID component, the first RFID component associated with a mobile device;
determining a response time of the communication between the first RFID component and the second RFID component;
determining a location of the first RFID component associated with the mobile device based on the response time of the communication between the first RFID component and the second RFID component, wherein the response time of the communication between the first RFID and the second RFID is associated with a charge time of one of the first RFID component and the second RFID component; and
executing an operation on the mobile device in response to a determination that the location of the mobile device corresponds to a trigger location.

9. The method of claim 8, wherein the second RFID component has a fixed location and the first RFID component has a dynamic location, the first RFID component remote from the second RFID component.

10. The method of claim 8, wherein determining a location of the first RFID component comprises communicating the first RFID component with a third RFID component remote to the first RFID component and the second RFID component and determining a response time of the communication between the first RFID component and the third RFID component to further determine the location of the first RFID component.

11. The method of claim 8, wherein the communication between the first RFID component and the second RFID component comprises identifier information.

12. The method of claim 11, wherein a power level of the communication between the first RFID component and the second RFID component is dynamically adjusted based on the identifier information.

13. The method of claim 11, wherein the operation executed on the mobile device is selected based on the identifier information in the communication.

14. The method of claim 8, wherein determining the location of the first RFID component further comprises determining a travel vector of the first RFID component based on a change in location over time.

15. The method of claim 8, wherein determining the location of the first RFID component has a margin of error of less than 30 centimeters.

16. The method of claim 8, wherein determining the location of the first RFID component comprises determining a three-dimensional location of the first RFID component.

17. The method of claim 11, wherein at least one parameter of the communication between the first RFID component and the second RFID component is dynamically adjusted based on the identifier information.

18. A computer program product comprising a computer readable storage medium having program instructions embodied therewith, the program instructions readable/executable by a processor to cause the processor to:
receive, by the processor, communication data for communication between a first radio frequency identifier (RFID) component and a second RFID component and between the first RFID component and a third RFID component, the first RFID component associated with a mobile device;
determine, by the processor, response times of the communications between the first RFID component and the second RFID component and between the first RFID component and the third RFID component based on the communication data, wherein the response times are associated with a charge time of a corresponding RFID component;
determine, by the processor, a location of the first RFID component associate with the mobile device based on the response time and known locations of the second RFID component and the third RFID component; and
execute, by the processor, an operation affecting the mobile device in response to a determination that the mobile device corresponds to a trigger location.

19. The computer program product of claim 18, wherein the operation comprises at least one of a restriction operation reducing a functionality of the mobile device and a permission operation increasing a functionality of the mobile device.

20. The computer program product of claim 18, wherein the program instructions further cause the processor to provide a user interface associated with the mobile device, the user interface to receive a setting selection input to modify execution of the operation affecting the mobile device.

* * * * *